United States Patent [19]
Lee

[11] Patent Number: 6,052,022
[45] Date of Patent: Apr. 18, 2000

[54] VOLTAGE BOOSTING CIRCUITS HAVING OVER-VOLTAGE PROTECTION CIRCUITS THEREIN

[75] Inventor: Chul-Kyu Lee, Kyungki-do, Rep. of Korea

[73] Assignee: Samsung Electronics Co., Ltd., Rep. of Korea

[21] Appl. No.: 09/069,382

[22] Filed: Apr. 29, 1998

[30] Foreign Application Priority Data

Apr. 30, 1997 [KR] Rep. of Korea ................ 97-16610

[51] Int. Cl.[7] ................................................ H03K 7/162
[52] U.S. Cl. .................... 327/589; 327/536; 327/537; 327/309; 365/226; 363/60; 307/110
[58] Field of Search .................... 327/589, 536, 327/535, 537, 538, 545, 546, 309; 365/227, 226, 189.09; 363/59, 60; 307/110, 35

[56] References Cited

U.S. PATENT DOCUMENTS

| | | | |
|---|---|---|---|
| 5,023,465 | 6/1991 | Douglas et al. | 365/203 |
| 5,180,928 | 1/1993 | Choi | 327/541 |
| 5,266,842 | 11/1993 | Park | 327/534 |
| 5,315,557 | 5/1994 | Kim et al. | 365/222 |
| 5,337,284 | 8/1994 | Cordoba et al. | 365/227 |
| 5,343,088 | 8/1994 | Jeon | 327/536 |
| 5,367,489 | 11/1994 | Park et al. | 365/189.11 |
| 5,539,351 | 7/1996 | Gilsdorf et al. | 327/379 |
| 5,553,030 | 9/1996 | Tedrow et al. | 365/226 |
| 5,587,956 | 12/1996 | Tanida | 365/226 |
| 5,589,793 | 12/1996 | Kassapian | 327/536 |
| 5,592,115 | 1/1997 | Kassapian | 327/239 |
| 5,608,677 | 3/1997 | Yoon et al. | 365/189.09 |
| 5,625,544 | 4/1997 | Kowshik et al. | 363/59 |
| 5,629,646 | 5/1997 | Menezes et al. | 327/536 |
| 5,638,023 | 6/1997 | Kim | 327/589 |
| 5,642,073 | 6/1997 | Manning | 327/536 |
| 5,670,908 | 9/1997 | Kim et al. | 327/543 |
| 5,694,308 | 12/1997 | Cave | 363/59 |
| 5,706,230 | 1/1998 | Lee | 365/189.11 |
| 5,717,581 | 2/1998 | Canclini | 363/60 |
| 5,726,944 | 3/1998 | Pelley, III et al. | 365/226 |
| 5,767,729 | 6/1998 | Song | 327/390 |
| 5,781,473 | 7/1998 | Javanifard et al. | 365/185.18 |
| 5,796,600 | 8/1998 | Yun | 363/60 |
| 5,801,578 | 9/1998 | Bereza | 327/536 |
| 5,801,934 | 9/1998 | Lacey et al. | 363/60 |
| 5,818,289 | 10/1998 | Chevallier et al. | 327/536 |
| 5,825,640 | 10/1998 | Quigley et al. | 363/60 |
| 5,828,095 | 10/1998 | Merritt | 257/299 |
| 5,841,725 | 11/1998 | Kang et al. | 365/226 |
| 5,847,614 | 12/1998 | Gilbert et al. | 331/14 |
| 5,861,772 | 1/1999 | Lee | 327/589 |
| 5,872,733 | 2/1999 | Buti et al. | 365/185.19 |
| 5,874,847 | 2/1999 | Kim et al. | 327/390 |
| 5,874,850 | 2/1999 | Pulvirenti et al. | 327/536 |
| 5,880,622 | 3/1999 | Evertt et al. | 327/535 |
| 5,886,551 | 3/1999 | Narahara | 327/157 |
| 5,889,428 | 3/1999 | Young | 327/536 |
| 5,892,670 | 4/1999 | Lacey et al. | 363/60 |
| 5,912,560 | 6/1999 | Pasternak | 324/536 |
| 5,914,632 | 6/1999 | Footuhi et al. | 327/537 |
| 5,920,470 | 7/1999 | Jin | 363/60 |
| 5,929,678 | 7/1999 | Kasperkovitz et al. | 327/157 |

*Primary Examiner*—Toan Tran
*Assistant Examiner*—Minh Nguyen
*Attorney, Agent, or Firm*—Myers Bigel Sibley & Sajovec

[57] ABSTRACT

Voltage boosting circuits having improved overvoltage protection circuits therein include a first pumping circuit and a second pumping circuit. The first pumping circuit includes comprises a first charge pump having an output coupled to a boosted voltage signal line and an oscillator for driving the first charge pump. The second pumping circuit comprises a second charge pump having an output coupled to the boosted voltage signal line and an active kicker circuit for driving the second charge pump upon receipt of a control signal during an active mode of operation. This control signal may be an address strobe signal, such as a complementary row address strobe signal (RASB). An overvoltage protection circuit is also provided. This overvoltage protection circuit includes a circuit to detect an overvoltage condition if a potential of the boosted voltage signal line exceeds a first threshold and a circuit to block receipt of the control signal by the active kicker circuit if the overvoltage condition is detected. By blocking the control signal, the active kicker circuit which drives the second charge pump can be disabled.

22 Claims, 4 Drawing Sheets

VOLTAGE BOOSTING CIRCUITS HAVING OVER-VOLTAGE PROTECTION CIRCUITS THEREIN

FIELD OF THE INVENTION

The present invention relates to integrated circuits and more particularly to integrated circuits having voltage boosting circuits therein.

BACKGROUND OF THE INVENTION

Integrated circuit memory devices typically require on-chip voltages that are greater in magnitude than voltages supplied thereto from external power supplies (e.g., Vdd). Such on-chip voltages are typically generated using charge pumping circuits. Typical charge pumping circuits are described in U.S. Pat. Nos. 5,706,230 to Lee entitled "Internal Voltage Boosting Method and Circuit For A Semiconductor Memory Device", 5,608,677 to Yoon et al. entitled "Boosting Voltage Circuit Used in Active Cycle of a Semiconductor Memory Device", 5,180,928 to Choi entitled "Constant Voltage Generation of Semiconductor Device, 5,343,088 to Jeon entitled "Charge Pump Circuit for a Substrate Voltage Generator of a Semiconductor Memory Device", 5,266,842 to Park entitled "Charge Pump Circuit for a Substrate Voltage Generator" and 5,315,557 to Kim et al. entitled "Semiconductor Memory Device Having Self-Refresh and Back-Bias Circuitry", assigned to the present assignee, the disclosures of which are hereby incorporated herein by reference. Copending and commonly assigned U.S. application Ser. No. 08/748,189 to Yoon et al. entitled "Voltage Boosting Circuits Having Backup Voltage Boosting Capability", now U.S. Pat. No. 5,796,293, the disclosure of which is hereby incorporated herein by reference, also discloses techniques for boosting voltages in an integrated circuit to levels greater than the magnitude of the power supply voltages applied to the circuit.

A conventional voltage boosting circuit having a voltage level determining circuit therein is also disclosed in U.S. Pat. No. 5,587,956 to Tanida entitled "Semiconductor Memory Device Having Function of Generating Boosted Potential". An improved voltage pumping circuit is also disclosed in U.S. Pat. No. 5,367,489 to Park et al. entitled "Voltage Pumping Circuit For Semiconductor Memory Devices", assigned to the present assignee, the disclosure of which is hereby incorporated herein by reference.

FIG. 1 is a block diagram of a conventional high-voltage generating circuit for a semiconductor device. In FIG. 1, the reference numerals "11" and "12" denote a first charge pumping device and a second charge pumping device, respectively. The first pumping device 11 comprises an oscillator 11A, which operates both in standby and active modes when a control clock signal (e.g., complementary row-address-strobe (RASB)) maintains 'high' and 'low' logic levels, respectively, and a first charge pumping circuit 11 B. The second charge pumping device 12 comprises an active kicker circuit 12A, which is enabled in the active state when the control clock signal (e.g., RASB) maintains the 'low' logic level to produce a pumping signal, and a second charge pumping circuit 12B for pumping charges in accordance with the pumping signal received from the active kicker 12A.

Typically, the pumping efficiency of the first pumping device 11 is maintained relatively low so as to reduce the amount of current consumed during the standby mode, while the pumping efficiency of the second pumping device 12 is maintained relatively high so as to compensate for large currents which may be generated during the active mode of operation. A voltage level detecting section 13 enables the charge pumping circuits 11B and 12B in the first and second pumping devices 11 and 12, so that these circuits can perform charge-pumping operations to maintain high voltage levels (within a predetermined voltage range) if the high voltage (Vpp) detected by the voltage level detecting section 13 becomes lower than a predetermined lower limit threshold. A pre-charging section 14 pre-charges a high-voltage output node for a rapid pumping operation at an initial state. A clamping device 15 prevents the high on-chip voltage Vpp from rising over a predetermined level by "sinking" excessive charges generated during pumping to the supply voltage line if the high voltage Vpp becomes greater than the predetermined level.

The clamping device 15, as shown in detail in FIG. 2, may comprise an NMOS pass transistor N1 and a resistor R1. As will be understood by those skilled in the art, if the high voltage Vpp becomes higher than the sum of the supply voltage Vdd and the threshold voltage Vth between the gate and source of the pass transistor N1, the pass transistor N1 will turn on and form a discharge path through the resistor R1 to the supply voltage line (Vdd). By using this clamping device 15, the high voltage Vpp can typically be maintained at a level which is at or below the sum of the supply voltage Vdd and the gate-source threshold voltage Vth of the pass transistor N1.

Unfortunately, although the NMOS pass transistor N1 may have a significant channel width for providing a low resistance path to the supply line Vdd, the delay associated with discharging an excessively large Vpp may be substantial. Moreover, the period of the external control signal (e.g., RASB) may become too short during high-speed operation and, therefore, the level of the high voltage Vpp may be increased (by the active kicker 12A and the second charge pumping circuit 12B) to an excessive level which may damage devices and isolation regions connected to or adjacent the high voltage Vpp signal line.

Thus, notwithstanding the above described voltage boosting circuits, there continues to be a need for voltage boosting circuits which are less likely to damage devices connected thereto or shorten the lifetime of memory circuits requiring boosted voltage levels.

SUMMARY OF THE INVENTION

It is therefore an object of the present invention to provide integrated circuits having improved voltage boosting circuits therein.

It is another object of the present invention to provide integrated circuit memory devices having voltage boosting circuits therein which inhibit overvoltage conditions.

These and other objects, features and advantages of the present invention are provided by integrated circuits having improved voltage boosting devices therein with overvoltage detection and prevention capability. According to an embodiment of the present invention, an integrated circuit memory device is provided having circuits therein which require boosted voltages that are internally generated by charge pumps. These boosted voltages are provided on a boosted voltage signal line(s). To achieve boosted voltage levels, a first pumping circuit and a second pumping circuit are provided. The first pumping circuit comprises a first charge pump having an output coupled to the boosted voltage signal line and an oscillator for driving the first charge pump. The second pumping circuit comprises a second charge pump having an output coupled to the boosted voltage signal line and an active kicker circuit for driving the second charge pump upon receipt of a control signal during an active mode of operation. This control signal may be a complementary address strobe signal, such as a complementary row address strobe signal (RASB).

An overvoltage protection circuit is also provided. This overvoltage protection circuit includes means, coupled to the boosted voltage signal line, for detecting an overvoltage condition if a potential of the boosted voltage signal line exceeds a first threshold and means for blocking receipt of the control signal by the active kicker circuit if the overvoltage condition is detected. By blocking the control signal, at least the active kicker circuit which drives the second charge pump can be disabled. In the event the oscillator also requires receipt of the control signal to drive the first charge pump, the overvoltage protection circuit may, if necessary for additional protection, block receipt of the control signal by the oscillator. A first voltage level detector and a clamping circuit are also provided. The first voltage level detector has an input electrically coupled to the boosted voltage signal line and the clamping circuit is electrically coupled between the boosted voltage signal line and a power supply line. This first voltage level detector may enable the first and second charge pumps in the event the voltage level on the boosted voltage signal line drops below a predetermined low voltage threshold.

According to a preferred aspect of the present invention, the detecting means provided by the overvoltage protection circuit includes a second voltage level detector. Like the first voltage level detector, this second voltage level detector also has an input electrically coupled to the boosted voltage signal line. The detecting means also includes an operating cycle detection circuit. This operating cycle detection circuit has a first input electrically coupled to an output of the second voltage level detector and a second input for receiving a true or complementary version of the control signal. The operating cycle detection circuit generates an output that can be used to pass (or block) the control signal to (or from) the active kicker circuit. Here, the blocking means preferably includes an AND gate, as a final stage in the overvoltage protection circuit. This AND gate has a first input electrically coupled to an output of the operating cycle detection circuit, a second input for receiving a true or complementary version of the control signal and an output electrically coupled to the active kicker circuit which drives the second charge pump. If necessary, the output of the AND gate may also be provided as an input to the oscillator so that the first charge pump can be disabled if an overvoltage condition is detected. Thus, if the output of the operating cycle detection circuit is set to a logic 0 value, the control signal can be blocked from the output of the AND gate and the active kicker circuit can be advantageously disabled to thereby prevent operation of the second charge pump. By disabling operation of the second charge pump (and possibly the first charge pump as well) upon detection of an overvoltage condition, power consumption can be conserved and the ability of the clamping circuit to sink excessive charges and prevent deterioration of active devices connected to the boosted voltage signal line can be enhanced.

DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
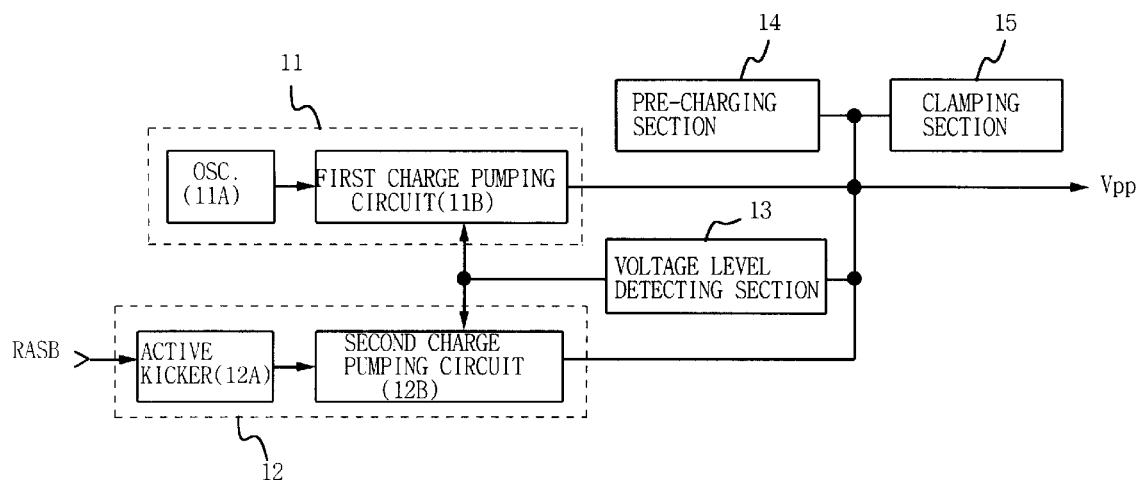
FIG. 1 is a block electrical schematic of a voltage boosting circuit according to the prior art.
Figure 2:
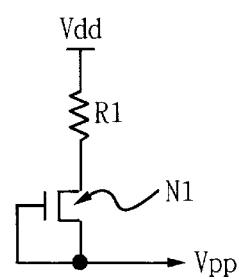
FIG. 2 is an electrical schematic of a clamping circuit according to the prior art.
Figure 3:
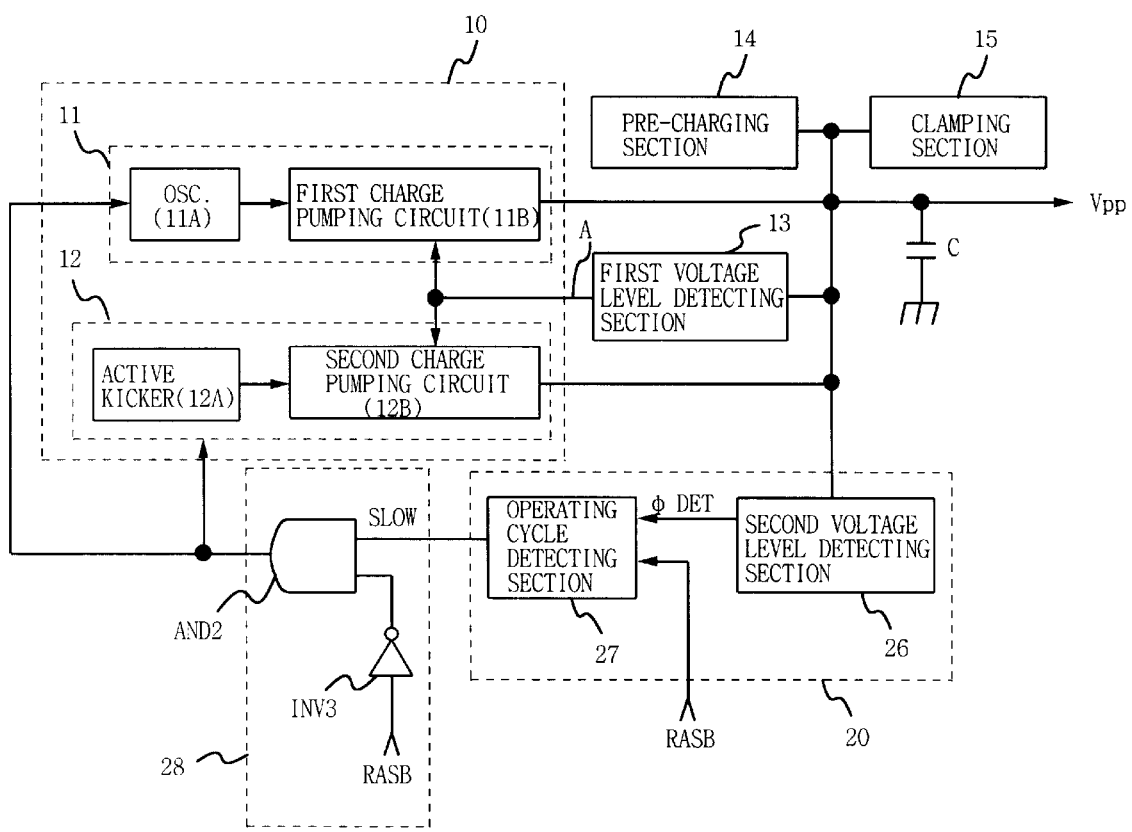
FIG. 3 is a block electrical schematic of a voltage boosting circuit according to a embodiment of the present invention.

Referring now to FIG. 3, a general description of a preferred embodiment of a voltage boosting circuit according to the present invention will be described. In particular, a first pumping circuit 11 and a second pumping circuit 12 are provided as part of a charge pumping circuit 10. This charge pumping circuit 10 can pump at a first rate during a standby mode of operation and at a higher second rate during an active mode of operation. The first pumping circuit 11 comprises a first charge pump 11B having an output coupled to a boosted voltage signal line (Vpp) and an oscillator 11A for driving the first charge pump 11B (e.g., during a standby mode of operation). The second pumping circuit 12 comprises a second charge pump 12B having an output coupled to the boosted voltage signal line and an active kicker circuit 12A for driving the second charge pump 12B upon receipt of a control signal during an active mode of operation. As illustrated, this control signal may be a complementary address strobe signal, such as a complementary row address strobe signal (RASB). This complementary row address strobe signal may be set at a logic I value during the standby mode of operation and at a logic 0 value during an active mode of operation.

An overvoltage protection circuit (blocks 20 and 28) is also provided. This overvoltage protection circuit includes means, coupled to the boosted voltage signal line, for detecting an overvoltage condition if a potential of the boosted voltage signal line exceeds a first threshold and means for blocking receipt of the control signal by the active kicker circuit 12A if the overvoltage condition is detected. By blocking the control signal, at least the active kicker circuit 12A which drives the second charge pump 12B can be disabled. In the event the oscillator 11A also requires receipt of the control signal to drive the first charge pump 11B, as illustrated, the overvoltage protection circuit may block receipt of the control signal by the oscillator 11A. A first voltage level detector 13 and a clamping circuit 15 are also provided. The first voltage level detector 13 has an input electrically coupled to the boosted voltage signal line and the clamping circuit 15 is electrically coupled between the boosted voltage signal line and a power supply line. This first voltage level detector 13 may have an output (signal "A") which can enable the first and second charge pumps 11B, 12B in the event the voltage level on the boosted voltage signal line drops below a predetermined low voltage threshold. A precharging circuit 14 is also provided to precharge the output mode which is electrically connected to the capacitor "C" at the output node.

According to a preferred aspect of the present invention, the detecting means provided by the overvoltage protection circuit includes a second voltage level detector 26. Like the first voltage level detector, this second voltage level detector 26 also has an input electrically coupled to the boosted voltage signal line. However, the second voltage level detector 26 generates an upper limit detecting signal φDET if an overvoltage condition is detected. The detecting means also includes an operating cycle detection circuit 27. This operating cycle detection circuit 27 has a first input electrically coupled to an output of the second voltage level detector 26 and a second input for receiving a true or complementary version of the control signal. The operating cycle detection circuit 27 generates an output (signal "SLOW") that can be used to pass (or block) the control signal to (or from) the active kicker circuit 12A. Here, the blocking means preferably includes an AND gate (AND2) as a final stage in the overvoltage protection circuit. This AND gate has a first input electrically coupled to an output of the operating cycle detection circuit 27, a second input for receiving a true or complementary version of the control signal (e.g., RASB) and an output electrically coupled to the active kicker circuit 12A which drives the second charge pump 12B. An inverter INV3 is also provided for inverting the control signal, if necessary. The output of the AND gate (AND2) may also be provided as an input to the oscillator 11A so that the first charge pump 11B can also be disabled if an overvoltage condition is detected. Thus, if the output of the operating cycle detection circuit 27 is set to a logic 0 value (i.e., signal "SLOW=0"), the control signal can be blocked from the output of the AND gate and the active kicker circuit 12A can be advantageously disabled to thereby prevent operation of the second charge pump 12B. By disabling operation of the second charge pump 12B (and possibly the first charge pump 11B as well) upon detection of an overvoltage condition, power consumption can be conserved and the ability of the clamping circuit 15 to sink excessive charges and prevent deterioration of active devices connected to the boosted voltage signal line (Vpp) can be enhanced.

Figure 4:
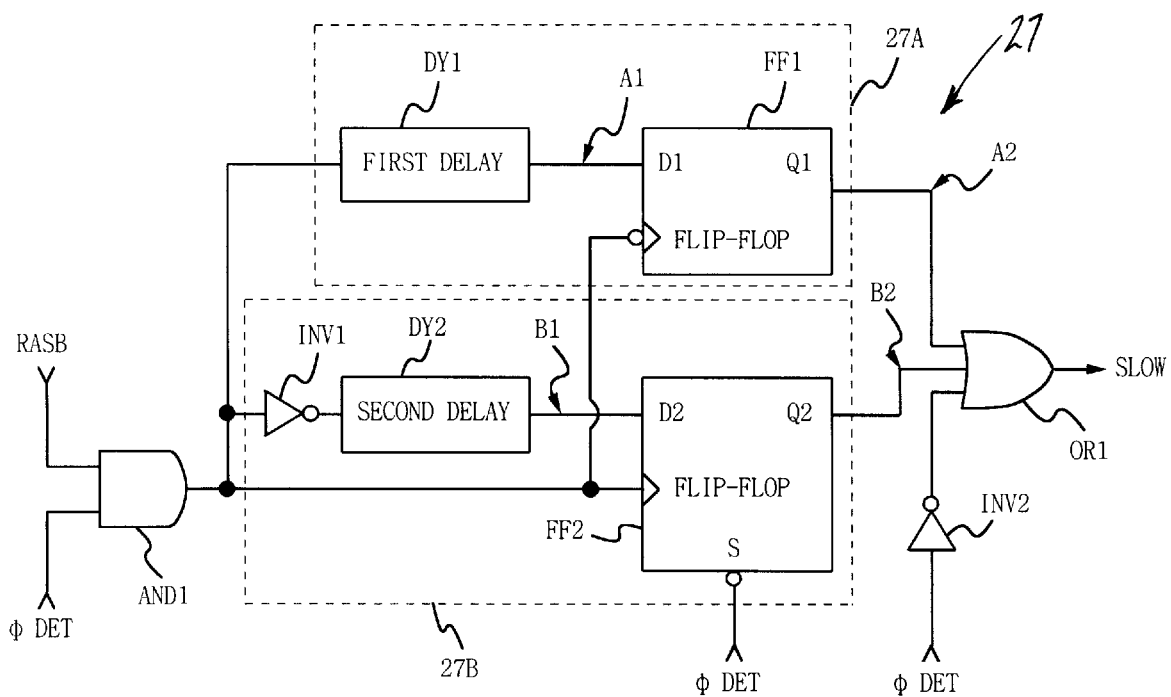
FIG. 4 is an electrical schematic of the preferred operating cycle detection circuit 3.

The operating cycle detecting circuit 27, as illustrated in detail in FIG. 4, includes an input gate AND1. This input gate has a first input connected to the control signal (RASB) and a second input connected to the output of the second voltage level detector 26. This second input receives the upper limit detecting signal φDET. A first discrimination circuit 27A is also provided for producing a first discrimination signal A2 by comparing a rear end of the delayed control signal having passed the input gate AND1 with a front end of a following control signal. A second discrimination circuit 27B is also provided for producing a second discrimination signal B2 by comparing the front end of the delayed control signal having passed the input gate AND1 with the rear end of the following control signal, and an output gate OR1 for producing the gate signal SLOW by combining the output signals A2 and B2 of the first and second discrimination circuits 27A and 27B with an inverted version of the upper limit detection signal φDET (inverted by inverter INV2).

The first discrimination circuit 27A comprises a first delay section DY1 for delaying the operating signal having passed the input gate section AND1 for a predetermined time, and a D-type flip-flop FF1 for receiving the front end of the delayed signal A1 of the first delay DY1 as its data input and receiving the rear end of the following control signal as its clock input. The second discrimination circuit 27B comprises an inverter INV1 for inverting the control signal having passed the input gate AND1, a second delay unit DY2 for delaying the inverted signal for a predetermined time, and a D-type flip-flop FF2 for receiving the front end of the delayed signal B1 as its data input and receiving the rear end of the following control signal as its clock input.

Figure 5:
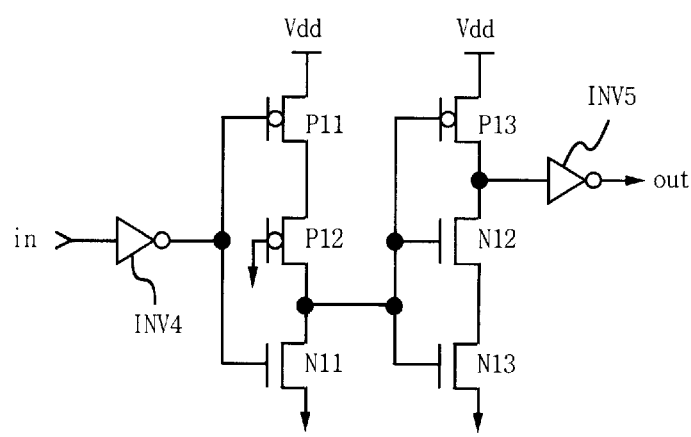
FIG. 5 is a electrical schematic of the delay circuits in the preferred operating cycle detection circuit of FIG. 4.

Referring to FIG. 5, the first or second delay DY1 or DY2 units each comprise: an inverter INV4 for inverting an input signal, a PMOS transistor P11 receiving the output signal of the inverter INV4 through its gate and receiving the supply voltage through its source, an NMOS transistor N11 receiving the output of the inverter INV4 through its gate, and whose source is connected to ground, a PMOS transistor P12 whose gate is connected to ground, whose source is connected to the drain of the PMOS transistor P11 and whose drain is connected to the drain of the NMOS transistor N11, a PMOS transistor P13 whose gate is connected to the drain of the NMOS transistor N11 and whose source is connected to the supply voltage, an NMOS transistor N13 whose gate is connected to the drain of the NMOS transistor N11 and whose source is connected to ground, an NMOS transistor N12 whose gate is connected to the drain of the NMOS transistor N11, whose source is connected to the drain of the NMOS transistor N13, and whose drain is connected to the drain of the PMOS transistor P13, and an inverter INV5 for inverting the drain output signal of the NMOS transistor N12. The delay time of the delay according to the present invention can be adjusted by varying the turn-on resistance values of the PMOS and NMOS transistors P12 and N12.

Figure 6:
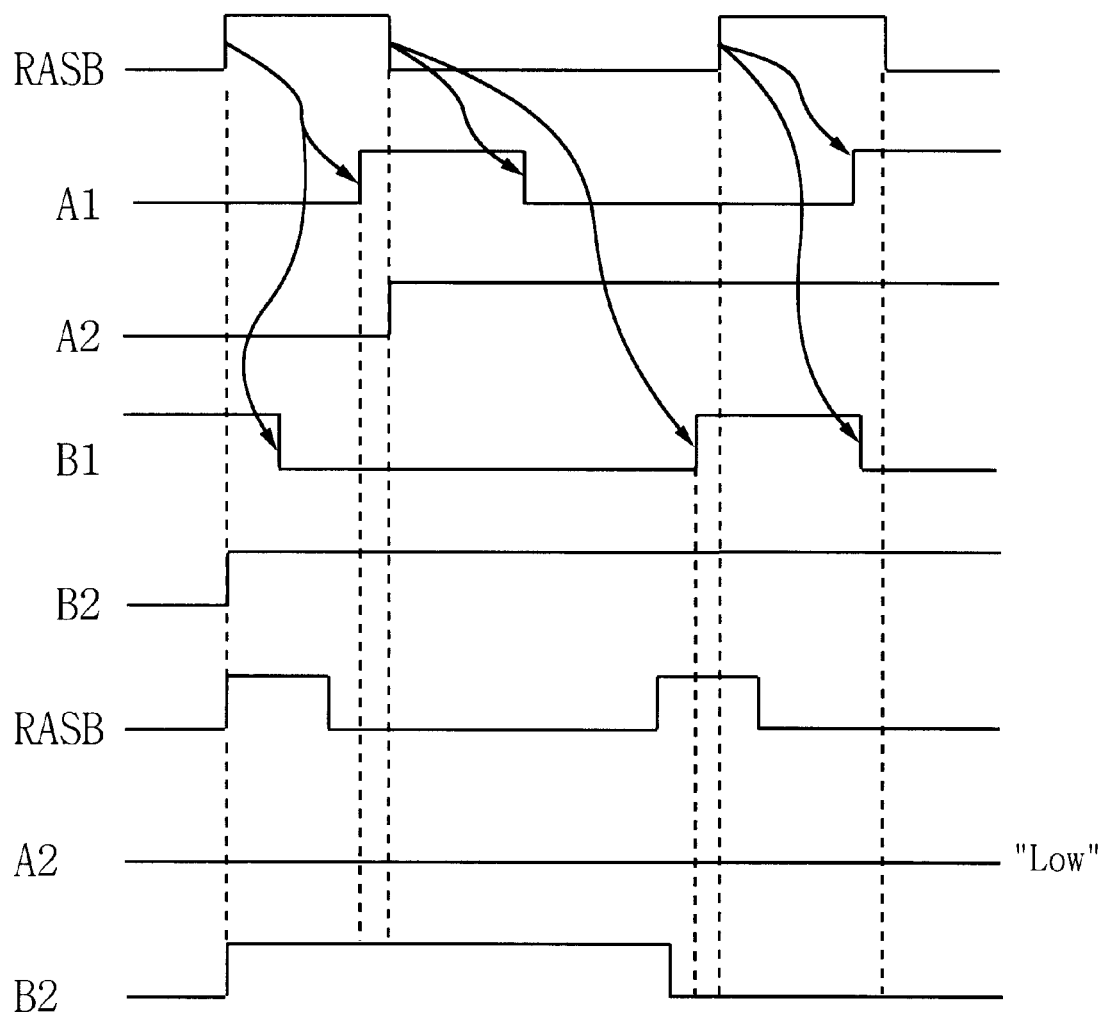
FIG. 6 is a timing diagram which illustrates operation of the operating cycle detection circuit of FIG. 3.

FIG. 6 is a timing diagram which illustrates the operation of the operating cycle detecting circuit 27 of FIG. 4. A complementary row address strobe signal RASB externally applied to the semiconductor memory device as the control signal passes the input gate section AND1 in an active period of the upper limit detection signal φDET. Otherwise, the strobe signal is intercepted. This signal (having passed the input gate section AND1) is delayed by the first delay DY1 for a predetermined time, and the delayed signal A1 is outputted from the first delay DY1. The delayed signal A1 is inputted to and latched in the flip-flop FF1 as its data input at the falling edge of the strobe signal RASB.

As shown as a solid line in FIG. 6, if the front end of the delayed signal A1 precedes the front end of the following strobe signal RASB, the 'high' level state of the strobe signal RASB is latched in the flip-flop FF1 and thus the output A2 of the flip-flop FF1 becomes 'high', resulting in the normal operation of the voltage boosting circuit. On the other hand, if the front end of the strobe signal RASB precedes the front end of the delayed signal Al as the operating cycle of the semiconductor device becomes fast (as shown by the dotted line in FIG. 6), the 'low' level state is latched in the flip-flop FF1 and thus the output A2 of the flip-flop FF1 becomes 'low'. In this event, the strobe signal RASB is intercepted and prevented from being applied to the charge pumping section 10. At the same time, the signal having passed the input gate section AND1 is inverted through the inverter INV1, and the inverted signal is delayed by the second delay DY2 for a predetermined time to be outputted as a delayed signal B1. The delayed signal B1 is then inputted to and latched in the flip-flop FF2 (as its data input) at the rising edge of the strobe signal RASB. If the front end of the delayed signal B1 precedes the rear end of the current strobe signal RASB (as shown by the solid line in FIG. 6), the 'high' level state is latched in the flip-flop FF2. This results in the normal operation of the charge pump circuit 10. Meanwhile, if the rear end of the current strobe signal RASB precedes the front end of the delayed signal B1 as the operating cycle of the semiconductor device becomes fast (as shown by the dotted line in FIG. 6), the 'low' level state is latched in the flip-flop FF2. When this occurs, the strobe signal RASB is intercepted and prevented from being applied to the charge pumping circuit 10. FIG. 6 also illustrates the timing of signals A2 and B2 when the strobe signal RASB is applied as a relatively short pulse.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. An integrated circuit memory device, comprising:
   a boosted voltage signal line;
   a first pumping circuit comprising a first charge pump having an output coupled to said boosted voltage signal line and an oscillator therein for driving the first charge pump;
   a second pumping circuit comprising a second charge pump having an output coupled to said boosted voltage signal line and an active kicker circuit therein for driving the second charge pump upon receipt of an active address strobe signal; and
   means, coupled to said boosted voltage signal line, for detecting an overvoltage condition if a potential of said boosted voltage signal line exceeds a first threshold and for blocking receipt of the active address strobe signal by the active kicker circuit if the overvoltage condition is detected.

2. An integrated circuit memory device comprising:
   a boosted voltage signal line;
   a first pumping circuit comprising a first charge pump having an output coupled to said boosted voltage signal line and an oscillator therein for driving the first charge pump;
   a second pumping circuit comprising a second charge pump having an output coupled to said boosted voltage signal line and an active kicker circuit therein for driving the second charge pump upon receipt of an active address strobe signal;
   means, coupled to said boosted voltage signal line, for detecting an overvoltage condition if a potential of said boosted voltage signal line exceeds a first threshold and for blocking receipt of the active address strobe signal by the active kicker circuit if the overvoltage condition is detected;
   a first voltage level detector having an input electrically coupled to said boosted voltage signal line; and
   a clamping circuit electrically coupled to said boosted voltage signal line and a power supply line.

3. The memory device of claim 2, wherein said means for detecting an overvoltage condition comprises a second voltage level detector having an input electrically coupled to said boosted voltage signal line.

4. The memory device of claim 3, wherein said means for detecting an overvoltage condition comprises an operating cycle detection circuit having a first input electrically coupled to an output of the second voltage level detector and a second input electrically coupled to an address strobe signal line.

5. The memory device of claim 4, wherein said means for detecting an overvoltage condition further comprises an AND gate having a first input electrically coupled to an output of the operating cycle detection circuit and a second input electrically coupled to the address strobe signal line.

6. A voltage boosting integrated circuit, comprising:
   a boosted voltage signal line;
   a first charge pumping device having a first output electrically coupled to said boosted voltage signal line;
   a second charge pumping device having a second output electrically coupled to said boosted voltage signal line, said second charge pumping device containing an active kicker circuit therein which is responsive to a kicker enable signal;
   means, coupled to said boosted voltage signal line, for detecting a first overvoltage condition if a potential of said boosted voltage signal line exceeds a first threshold and for generating a charge pump disable signal at a third output thereof if the first overvoltage condition is detected; and
   means, having a first input coupled to a control signal line and a second input coupled to the third output, for passing a control signal on the control signal line to a fourth output thereof as the kicker enable signal if the first overvoltage condition is not detected and for blocking the control signal on the control signal line from being passed to the fourth output if the first overvoltage condition is detected.

7. The circuit of claim 6, wherein said means for detecting a first overvoltage condition comprises:
   a voltage level detector having an input electrically coupled to said boosted voltage signal line; and
   an operating cycle detection circuit having a first input electrically coupled to an output of said voltage level detector and a second input electrically coupled to the control signal line.

8. The circuit of claim 7, wherein said means for passing and blocking a control signal comprises a first AND gate.

9. The circuit of claim 7, wherein said operating cycle detection circuit comprises a second AND gate and first and second delay units having respective inputs electrically coupled to an output of the second AND gate.

10. The circuit of claim 9, wherein the second AND gate has a first input electrically coupled to the output of said voltage level detector and a second input electrically coupled to the control signal line.

11. The circuit of claim 10, wherein said operating cycle detection circuit comprises first and second latches having respective inputs electrically coupled to outputs of the first and second delay units, respectively.

12. The circuit of claim 11, wherein said first and second latches have first and second clock inputs electrically coupled to the output of the second AND gate.

13. The circuit of claim 12, wherein the first and second clock inputs trigger on a falling edge and a rising edge of a signal provided at the output of the second AND gate, respectively.

14. The circuit of claim 13, wherein said operating cycle detection circuit further comprises a NOR gate having first and second inputs electrically coupled to respective outputs of said first and second latches and a third input responsive to a complement of the output of said voltage level detector.

15. An integrated circuit, comprising:
   a boosted voltage signal line;
   a first pumping circuit comprising a first charge pump having an output coupled to said boosted voltage signal line and an oscillator therein for driving the first charge pump;
   a second pumping circuit comprising a second charge pump having an output coupled to said boosted voltage signal line and an active kicker circuit therein for driving the second charge pump upon receipt of an active address strobe signal; and an overvoltage protection circuit that is electrically coupled to said boosted voltage signal line, detects an overvoltage condition if a potential of said boosted voltage signal line exceeds a threshold voltage and blocks receipt of the active address strobe signal by the active kicker circuit if the overvoltage condition is detected.

16. The circuit of claim 15, wherein said overvoltage protection circuit comprises:

a voltage level detector having an input electrically coupled to said boosted voltage signal line; and an operating cycle detection circuit having a first input electrically coupled to an output of said voltage level detector and a second input electrically coupled to a control signal line.

17. The circuit of claim 16, wherein said operating cycle detection circuit comprises an AND gate and first and second delay units having respective inputs electrically coupled to an output of the AND gate.

18. The circuit of claim 17, wherein the AND gate has a first input electrically coupled to the output of said voltage level detector and a second input electrically coupled to the control signal line.

19. The circuit of claim 18, wherein said operating cycle detection circuit comprises first and second latches having respective inputs electrically coupled to outputs of the first and second delay units, respectively.

20. The circuit of claim 19, wherein said first and second latches have first and second clock inputs electrically coupled to the output of the AND gate.

21. The circuit of claim 20, wherein the first and second clock inputs trigger on a falling edge and a rising edge of a signal provided at the output of the AND gate, respectively.

22. The circuit of claim 21, wherein said operating cycle detection circuit further comprises a NOR gate having first and second inputs electrically coupled to respective outputs of said first and second latches and a third input responsive to a complement of the output of said voltage level detector.

* * * * *